ABSTRACT OF THE DISCLOSURE

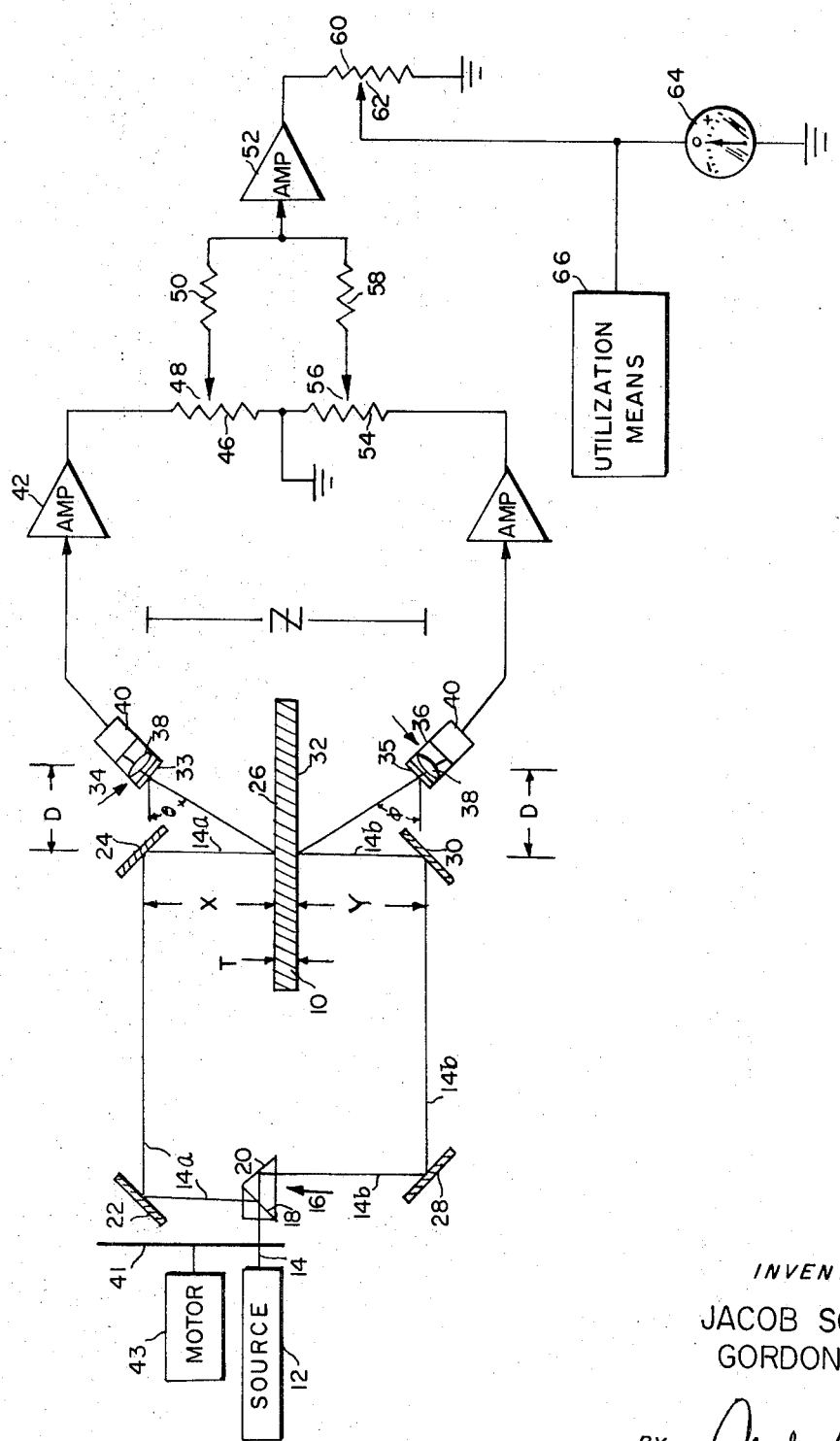
Feb. 23, 1971 — G. KANE ET AL — 3,565,531
ELECTRO-OPTICAL THICKNESS MEASUREMENT APPARATUS
Filed March 12, 1969
INVENTERS
JACOB SCHWARTZ
GORDON KANE
BY *Robert Flan Epps*
AGENT 3,565,531
ELECTRO-OPTICAL THICKNESS MEASUREMENT APPARATUS
Gordon Kane, Wayland, and Jacob Schwartz, Arlington, Mass., assignors to Sanders Associates, Inc., Nashua, N.H., a corporation of Delaware
Filed Mar. 12, 1969, Ser. No. 806,630
Int. Cl. G01b 11/02
U.S. Cl. 356—156
10 Claims

Apparatus for measuring the thickness of an object without requiring any physical contact comprises two sources of radiant energy disposed at a known fixed distance from one another, one on each side of the object which is to be measured and centroid tracking receivers disposed in a fixed spatial relationship with each of the sources. Radiant energy from the sources is directed to each side of the object to be measured and the centroid of energy reflected from each side of the object is tracked by the detector elements which produce output signals which represent the angle of arrival of the reflected energy. The detector output signals are electronically processed according to trigonometric principles such as to provide a signal representative of the thickness of the object being measured.

BACKGROUND OF THE INVENTION

Field of the invention

The present invention relates generally to electro-optics and more particularly to apparatus for the non-contact measurement of the thickness of an object.

Description of the prior art

Prior to the present invention there has existed a continuing requirement for a non-contact method and apparatus for measuring the thickness of an object. This requirement has been particularly evident in the steel industry where it is essential that metals be rolled to a given thickness with a minimum of error. Prior art thickness measurement techniques have generally required contact of the apparatus with the hot metal resulting in typically high rates of measurement tool wear and the attendant introduction of errors. Apparatus has also been provided for monitoring roller position to determine sheet thickness, however, the temperature expansion characteristics of the metal being rolled introduces errors and there is a tendency when the rolling apparatus is self-correcting of the adjustment mechanism to oscillate about the proper thickness value.

Alternative thickness measurement apparatus based upon the use of penetrating radiation such as X-rays or gamma rays has been employed in industries where generally non-metallic objects are to be measured. However, to determine metal thickness by measuring the amount of penetrating radiation which is transmitted or absorbed by the material, requires X-ray or gamma ray sources of such high intensity as to create serious radiation hazards and make this approach generally undesirable.

OBJECTS AND SUMMARY OF THE INVENTION

It is therefore a primary object of the present invention to provide a new and novel method and apparatus for the measurement of a dimension of an object.

It is another object of the present invention to provide apparatus of the above described character which does not contact the object to be measured.

It is a further object of the present invention to provide apparatus of the above described character having a laser energy source and a pair of centroid tracking photodetectors.

It is an additional object of the present invention to provide apparatus of the above described character which is operative with a diffusely reflecting object.

The foregoing as well as other objectives are accomplished by providing a source of radiant energy and a centroid tracking photodetector on each side of the object to be measured. Each photodetector is disposed at a known fixed distance from its associated energy source and the distance between the energy sources is also a known fixed value. Energy from the source is directed to the opposite surfaces of the object to be measured and energy reflected by the surfaces is detected and the centroid thereof is tracked by the respective photodetector. The output signals of the photodetectors are representative of the angles from which the reflected energy is received and are electronically processed according to the principles of trigonometry to produce an indication of the thickness of the object without requiring any physical contact with the object.

These and other objects, features and advantages of the present invention will become more apparent from the following detailed description taken in conjunction with the appended drawing.

BRIEF DESCRIPTION OF THE DRAWING

The drawing attached hereto is a schematic illustration of a non-contact thickness measurement system constructed in accordance with the principles of the present invention.

DESCRIPTION OF PREFERRED EMBODIMENT

The appended figure schematically illustrates the apparatus of the present invention whereby the thickness, T, of an object 10 may be accurately measured without the requirement that the object be physically contacted. The object 10 may for example be a sheet of steel undergoing a rolling process or a work piece in a machining process. A laser 12 provides radiant energy shown as ray 14 which is directed to a beam splitting prism 16 having a half-silvered reflecting surface 18 and a substantially totally reflecting surface 20. The laser energy is thereby divided into rays 14a and 14b which are directed perpendicularly to the original ray 14. Ray 14a is directed to a first mirror 22 where it is reflected perpendicularly such as to be incident upon a second mirror 24 from which the ray 14a is reflected to the surface 26 of the object 10 to be measured. The ray 14b is reflected by the totally reflective surface 20 of prism 16 to a third mirror 28 whereby it is reflected to a fourth mirror 30 and on to the opposite surface 32 of the object 10. The mirrors 24 and 30 thus are essentially individual sources of radiant energy the outputs of which are directed one to each surface of the object 10 which is to be measured. Although the rays 14a and 14b are shown as perpendicularly incident on the surfaces 26 and 32 the apparatus of the invention will operate equally well if these rays are incident at an angle other than 90 degrees. The two mirrors 24 and 30 are disposed at a fixed known distance, Z, from one another. The thickness, T, of the object 10 may thus be determined as $$T = Z - (x+y) \qquad (1)$$

where $x$ and $y$ are the distances of mirrors 24 and 30 from the respective surfaces 26 and 32 of the object 10. Since the distances, $x$ and $y$, are not directly measurable without contacting the object, their values must be determined trigonometrically. To accomplish this the present invention contemplates the use of photoelectric receivers 34 and 36 in association with the mirrors 24 and 30 respectively. Each of the receivers comprises a collecting lens 38 and a position sensitive photoelectric detector 40 disposed a fixed known distance, D, from the mirrors 24 and 30. Each receiver 34 and 36 may also be provided with a narrow bandwidth optical filter 33 and 35 each having a passband which matches the wavelength of the source 10. The thickness, T, of the object 10 thus is defined by the relationship:

$$T = Z - D(\tan \theta + \tan \phi) \qquad (2)$$

where $\theta$ and $\phi$ are the angles of arrival at the receivers 34 and 36 respectively of the radiant energy reflected from the surfaces 26 and 32. The receivers 34 and 36 are preferably of the centroid tracking type wherein the center of intersection of the laser beams 14a and 14b with the respective surfaces 26 and 32 is measured. Thus the receivers 34 and 36 produce a usable output even though the surfaces 26 and 32 may be diffusely reflective or inaccurately oriented in angle with respect to the beams 14a and 14b and even though the original laser energy 14 is imperfectly collimated. The centroid tracking type of receiver is further preferred in the practice of the present invention due to its capacity to reduce the effects of disturbing influences such as Schlieren in atmospheric temperature gradients and scintillation due to the Tyndall effect of dust particles in the atmosphere.

It is to be understood that although the present invention is described as including a laser energy source other sources of radiant energy are equally applicable and limitation to a laser is not intended. The laser has a unique advantage in applications of the invention to the measurement of red hot material thicknesses since interference filters are readily available which transmit narrow band laser light well while rejecting broadband incandescent light from the object being measured. For objects which are essentially non-self-radiating any light source which is spectrally compatible with the receivers may be used provided it is collimated reasonably well. If it is desired to employ the apparatus of the present invention in an environment wherein the background radiation is relatively intense the beam of energy 14 may be amplitude modulated either by a rotating chopper 41 driven by motor 43 or by direct electronic modulation of a laser source.

In practice the receivers 34 and 36 do not measure the angles $\theta$ and $\phi$ directly but operate to detect a deviation of the centroid of reflected energy from the receiver boresight axes. The output signals from the receivers 34 and 36 are zero when the centroid of the energy is on the boresight axis and are positive or negative values when the centroid deviates in one direction or the other. Thus $$\theta = \theta_0 + \Delta\theta \text{ and } \phi = \phi_0 + \Delta\phi$$

where $\theta_0$ and $\phi_0$ are preselected, fixed angles at which the receiver boresight axes are oriented. The output signals from the receivers 34 and 36 thus represent the angular deviation, $\Delta\theta$ and $\Delta\phi$ respectively, of the centroid of reflected energy from the boresight axes. Each of the receivers has a maximum field of view, $\Delta\theta_{max}$ and $\Delta\phi_{max}$, which is determined by the optical characteristics of the receivers; i.e. the size of the detectors 40 and the focal length of the lenses 38. Since the achievable precision in angular measurement is on the order of about $(1/100)\Delta\theta_{max}$ (or $(1/100)\Delta\phi_{max}$) it is preferred that the fields of view of the receivers 34 and 36 be as small as possible within the dynamic range requirements of a given application of the invention. The dynamic range requirements will be determined by the maximum angular excursions which it is anticipated that the reflected energy centroid will make from boresight.

The boresight axes of the receivers 34 and 36 may be calibrated with a sample of known thickness $T_0$, in place of object 10. The angles $\theta_0$ and $\phi_0$ are adjusted until the output of the apparatus indicates the known sample thickness. In this manner, it is possible to measure increments of thickness deviation from a reference value. By differentiating Equation 2 the thickness deviation is determined by $$dT = -D[\sec^2 \theta_0 d\theta + \sec^2 \phi_0 d\phi] \qquad (3)$$

where the values of D, $\theta_0$ and $\phi_0$ are known constants. Because there is no requirement for subtraction of large quantities, the percentage error in $dT$ is not substantially greater than the percentage error in the values of D, $\sec^2 \theta_0$ or $\sec^2 \phi_0$. Thus the deviation, $dT$ from the reference sample thickness, while accurate to only about $\pm 5$ percent in $dT$, provides an indication of measured thickness; i.e. $T_m = T_0 \pm dT$, which may easily be made accurate to about 0.05% in $T_m$ if the sample thickness, $T_0$, is on the order of 100 times the thickness deviation, $dT$. In addition to a calibration sample of thickness, $T_0$, a second sample having a thickness equal to $T_{mmax}$ may be desired to calibrate the full scale deviation value which it is desired to measure with the apparatus of the present invention.

Returning to the figure there is further illustrated the relatively simple analog signal processing circuitry which may provide a usable indication of the measured thickness of object 10. The output signal from each of the receivers 34 and 36 are representative of the quantities $d\theta$ and $d\phi$ respectively and may be applied to amplifiers 42 and 44 for amplification to usable levels. The $d\theta$ signal is coupled from amplifier 42 through resistor 46 to ground. Resistor 46 operates to multiply $d\theta$ by the constant value $\sec^2 \theta_0$ and the resulting $\sec^2 \theta_0 d\theta$ signal is removed via adjustable tap 48 and resistor 50 and applied to the input of summing amplifier 52. The signal representing the quantity $d\phi$ is similarly coupled through resistor 54 to ground and a signal proportional to $\sec^2 \phi_0 d\phi$ is removed via adjustable tap 56 through resistor 58 to the input of summing amplifier 52. The output of amplifier 52 is thus representative of the quantity $-(\sec^2 \theta_0 d\theta + \sec^2 \phi_0 d\phi)$ and may be applied through resistor 60 to ground. A signal corresponding to the quantity $-D(\sec^2 \theta_0 d\theta + \sec^2 \phi_0 d\phi)$, which by Equation 3 is equal to the thickness deviation from the standard, may be removed via adjustable tap 62 and coupled to a thickness deviation indication means 64. The signal removed by tap 62 may also be applied to a variety of utilization means 66. By way of illustration, the apparatus of the present invention may be applied to the precision control of processing rollers used in the manufacture of metals, plastics, paper and textiles. Another application of the invention lies in automated machining processes wherein the thickness deviation signal may be applied to a computer control system to provide automatic correction for such variables as machine tool flexure and workpiece thermal expansion.

It will thus be apparent that the objectives set forth hereinabove are efficiently met and, since certain changes may be made in the above described construction without departing from the scope of the invention it is intended that all matter contained in the foregoing description or shown in the attached figure be taken as illustrative and not in a limiting sense.

Having described what is new and novel and desired to secure by Letters Patent, what is claimed is:

1. Apparatus for measuring a dimension of a reflective object comprising:
    a source of radiant energy,
    first and second means for directing said radiant energy to each of two opposed surfaces of said object along said dimension,
    said first and second energy directing means disposed in a known fixed spatial relationship with one another such that said energy is reflected by each of said surfaces at an angle which is a known function of said dimension of said object,
    first and second means for detecting reflected radiant energy disposed in a known fixed spatial relationship with said first and second energy directing means respectively and operative to produce first and second output signals representative of the deviation from a reference of the angles at which said energy is reflected, and signal processing means coupled to said first and second detecting means for producing an output signal indicative of said dimension.

2. Apparatus as recited in claim 1 further including:
means for amplitude modulating said source of radiant energy.

3. Apparatus as recited in claim 1 wherein:
said source of radiant energy is a laser.

4. Apparatus as recited in claim 1 wherein:
said energy directing means includes means for splitting said radiant energy into first and second substantially equal intensity beams.

5. Apparatus as recited in claim 1 wherein:
said first and second detecting means each comprises a position sensitive photodetector element and means for focusing said reflected energy on said photodectector.

6. Apparatus as recited in claim 5 wherein:
each of said detecting means further includes an optical bandpass filter whereby radiant energy having wavelengths other than that of said source is reflected therefrom.

7. Apparatus as recited in claim 1 wherein:
said first and second energy directing means are disposed on opposite sides of said object and at a known fixed distance from one another whereby said radiant energy is directed perpendicularly to said opposed surfaces, and said first and second energy detecting means are disposed such that the optical boresight axes thereof are at preselected fixed angles with respect to said surfaces.

8. Apparatus as recited in claim 7 wherein:
said output signals from said first and second detecting means are electrical signals proportional to the angular deviation of the centroids of said energy reflected by said surfaces from said boresight axes.

9. Apparatus as recited in claim 8 where in said signal processing means comprises:

first and second means for multiplying the output signal from said first and second detecting means respectively by a constant value proportional to the square of the secant of said boresight angle, means coupled to said multiplying means for adding the outputs thereof, and means coupled to said adding means for multiplying the output thereof by a constant value proportional to the distance between said directing means and said detecting means, whereby a signal representative of the deviation in the dimension of said object from a reference dimension is provided.

10. Apparatus as recited in claim 9 further including:
indicating means coupled to said signal processing means for providing an indication of the deviation in the dimension of said object from said reference.

References Cited

UNITED STATES PATENTS

| | | | |
|---|---|---|---|
| 3,017,512 | 1/1962 | Wolbert | 250—219X |
| 3,179,800 | 4/1965 | McNamara | 250—219X |
| 3,187,185 | 6/1965 | Milnes | 250—222 |

WALTER STOLWEIN, Primary Examiner

U.S. Cl. X.R.

250—219, 272